(12) United States Patent
Allen

(10) Patent No.: US 6,447,022 B1
(45) Date of Patent: Sep. 10, 2002

(54) FLEXIBLE CONNECTOR

(75) Inventor: George M. Allen, Middle Grove, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 09/629,243

(22) Filed: Jul. 31, 2000

(51) Int. Cl.$^7$ ................................................ F16L 37/00
(52) U.S. Cl. ........................................ 285/305; 285/319
(58) Field of Search ................................. 285/305, 319

(56) References Cited

U.S. PATENT DOCUMENTS

| | | | | |
|---|---|---|---|---|
| 4,431,218 A | * | 2/1984 | Paul, Jr. et al. | 285/305 |
| 4,806,248 A | * | 2/1989 | Murken | 285/305 X |
| 5,016,922 A | * | 5/1991 | Le Mer et al. | 285/81 |
| 5,040,831 A | * | 8/1991 | Lewis | 285/305 |
| 5,152,555 A | * | 10/1992 | Szabu | 285/93 |
| 5,964,483 A | * | 10/1999 | Long et al. | 285/305 |
| 6,149,206 A | * | 11/2000 | DiRocco | 285/305 |

FOREIGN PATENT DOCUMENTS

| | | | | |
|---|---|---|---|---|
| WO | 94/07077 | * | 3/1994 | 285/305 |

* cited by examiner

*Primary Examiner*—Teri Pham Luu
(74) *Attorney, Agent, or Firm*—Heslin Rothenberg Farley & Mesiti P.C.

(57) ABSTRACT

A connector includes an outer sleeve and an inner sleeve. The outer sleeve has an inner wall and a pair of juxtaposed slots. The inner sleeve has an outer surface with a first groove and a second groove defined therein. A sealing member is located in the first groove of the inner sleeve. The sealing member provides a continuous seal between the inner wall of the outer sleeve and the outer surface of the inner sleeve when the inner sleeve is mated within the outer sleeve. A retaining member is configured to engage the pair of juxtaposed slots, of the outer sleeve, and the second groove, of the inner sleeve, when the inner sleeve is mated with the outer sleeve. The retaining member restricts the longitudinal movement of the inner and outer sleeves in relation to one another.

21 Claims, 6 Drawing Sheets

FLEXIBLE CONNECTOR

TECHNICAL FIELD

This invention relates generally to connectors, more particularly, to flexible connectors for securing two pieces of plumbing.

BACKGROUND INFORMATION

There are a number of previously known connectors for securing to pieces of plumbing. Such connectors, are commonly used in many industries and include amputee fittings, and standard plumbing couplers.

One type of previously known connector comprises an elongated metal band which extends around a flexible hose positioned over a rigid tube. A worm drive or similar mechanism reduces the diameter of the metal band around the hose to conform the material into sealing contact with the rigid tube. This type of connector, known as a hose clamp, however, is not appropriate for connecting two pieces of rigid tubing such as stainless-steel.

Connectors commonly used in industry currently do not have a radial range of flexibility for connecting two pieces of rigid plumbing which have a typical tolerance in the range of 0.005 to 0.002 inches. This makes connection of the two pieces time-consuming and difficult.

Accordingly, it is desirable to provide a flexible connector for various types of plumbing, which can be quickly and easily employed while still providing an adequate seal.

SUMMARY OF THE INVENTION

The present invention provides, in a first aspect, a connector comprising an outer sleeve and an inner sleeve. The outer sleeve has an inner wall and a pair of juxtaposed slots. The inner sleeve has an outer surface with a first groove and a second groove defined therein. A sealing member is located in the first groove of the inner sleeve. The sealing member provides a continuous seal between the inner wall of the outer sleeve and the outer surface of the inner sleeve when the inner sleeve is mated within the outer sleeve. A retaining member is configured to engage the pair of juxtaposed slots, of the outer sleeve, and the second groove, of the inner sleeve, when the inner sleeve is mated with the outer sleeve. The retaining member restricts the longitudinal movement of the inner and outer sleeves in relation to one another.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, a flexible connector is provided. The connector is flexible in the sense that slight axial and rotational movement is possible between its inner and outer sleeves while still maintaining a seal therebetween.

Examples of a flexible connector and a system for flexible connection, incorporating and using the novel features of the present invention are depicted in the figures and described in detail herein.

Figure 1:
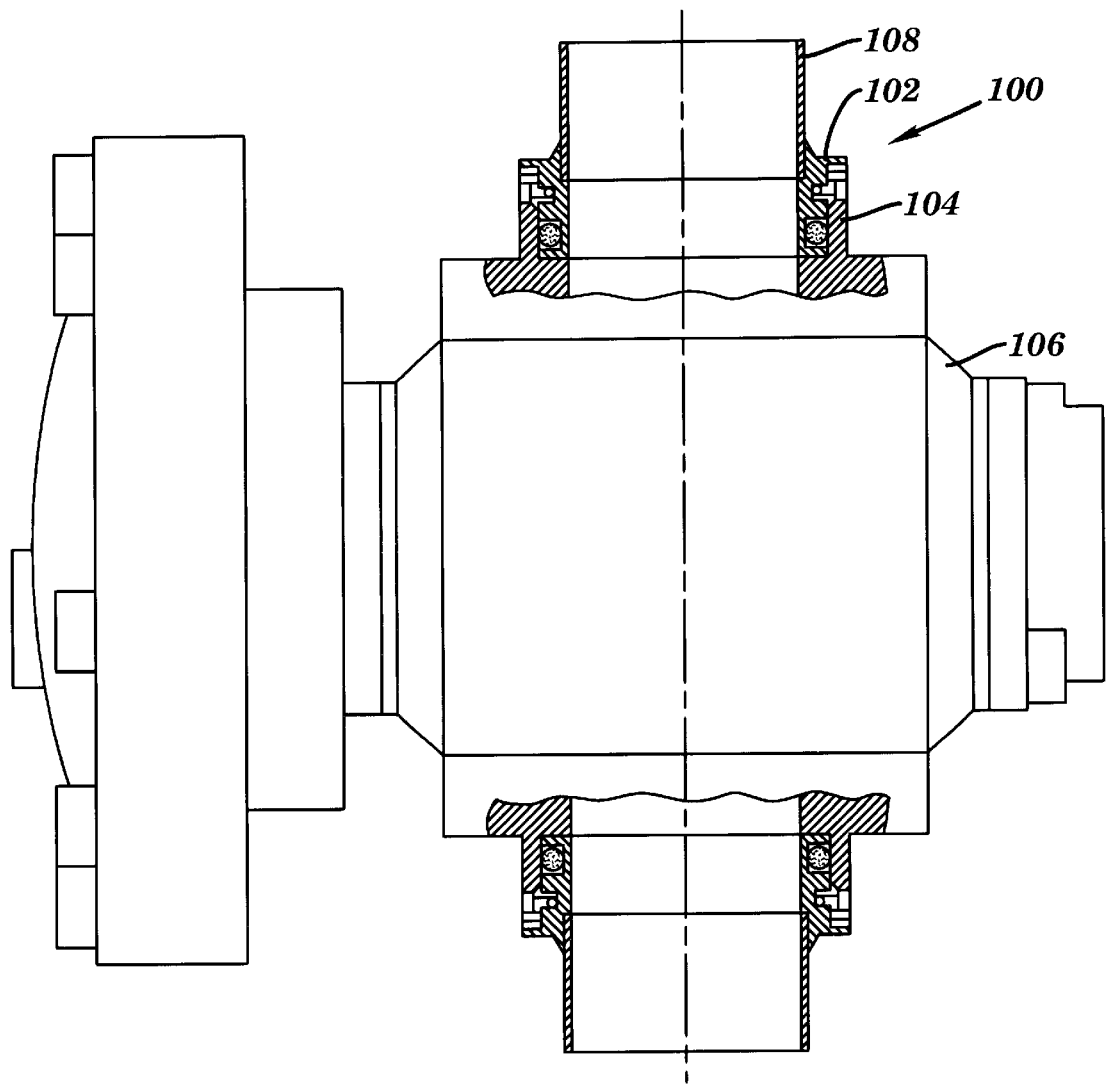
FIG. 1 is an elevational cross-section of a flexible connector in accordance with the present invention.

In an exemplary embodiment depicted in FIG. 1, flexible connector 100 is referred to as the assembled, or complete, device which functionally together with all parts thereof achieves the connection, and includes inner and outer sleeves 102 and 104, respectively. For purposes of illustration, FIG. 1 depicts outer sleeve 104 affixed on a valve 106, and inner sleeve 102 affixed to tubing 108. In the context of the present invention, the inner and outer sleeves may be affixed to various types of plumbing, such as pipe, tubing, valves and other plumbing components known in the art.

Figure 2:
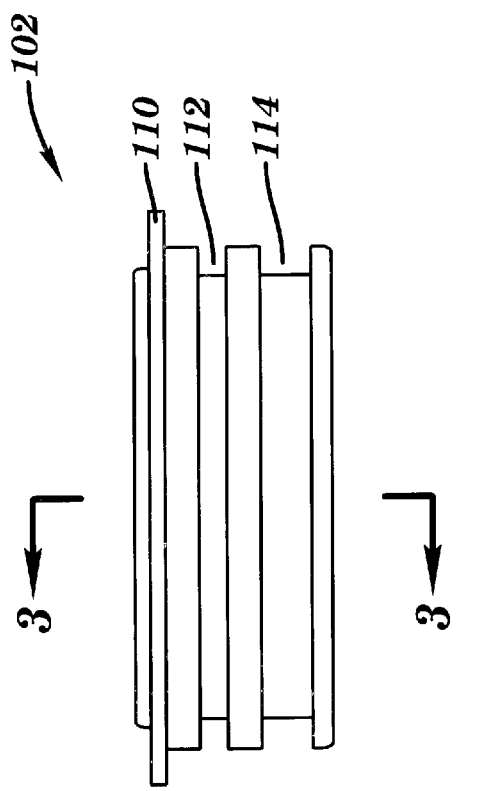
FIG. 2 is a side view of an inner sleeve of a flexible connector in accordance with the present invention.
Figure 3:
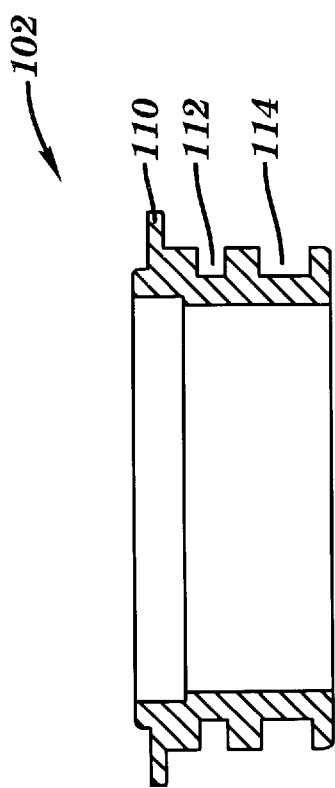
FIG. 3 is a cross-sectional view taken along lines 3—3 of FIG. 2.
Figure 5:
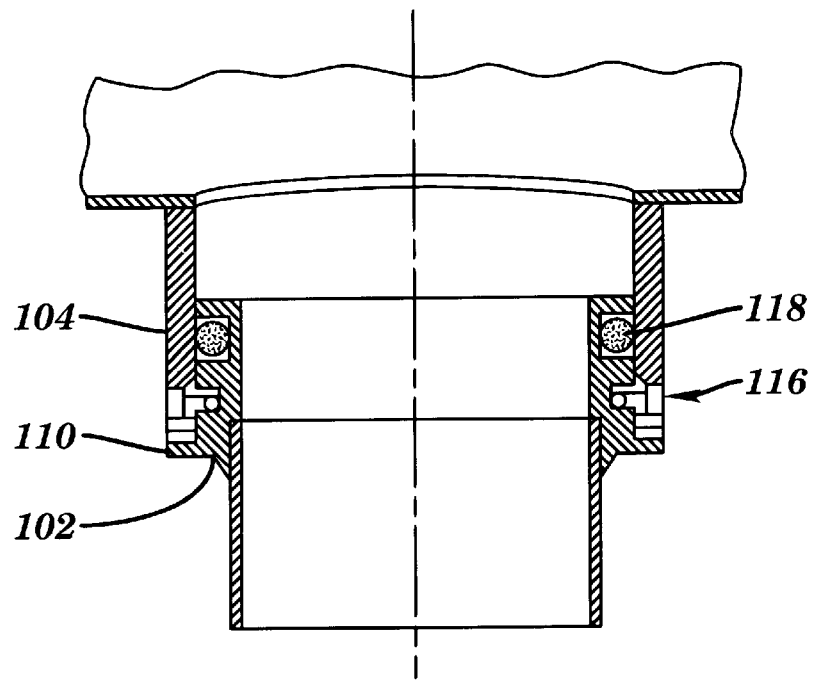
FIG. 5 is a cross sectional view of a flexible connector in accordance with the present invention.
Figure 4:
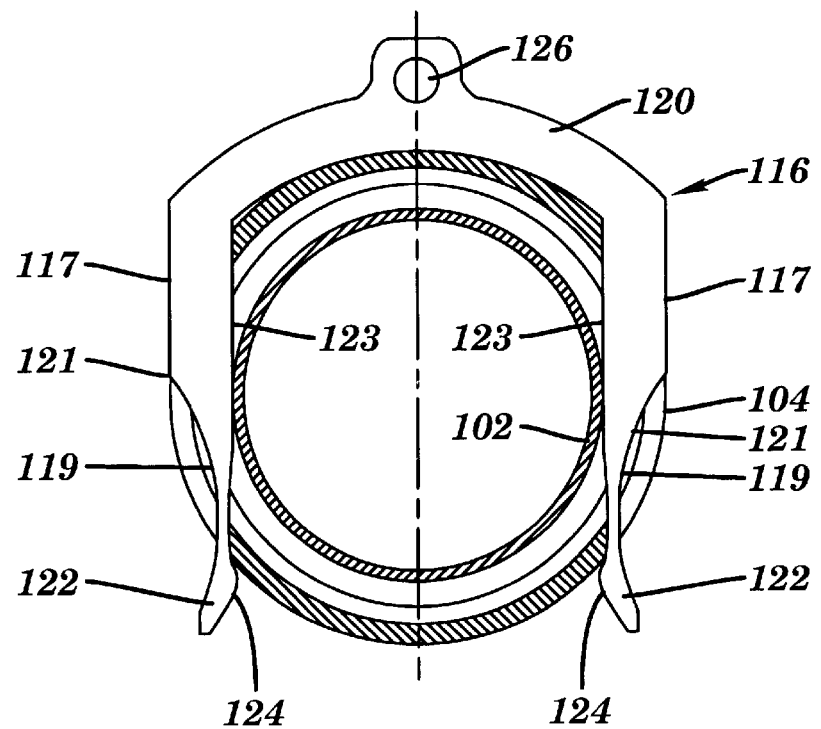
FIG. 4 is an end view depicting a flexible connector utilizing a retaining member in accordance with the present invention.
Figure 6:
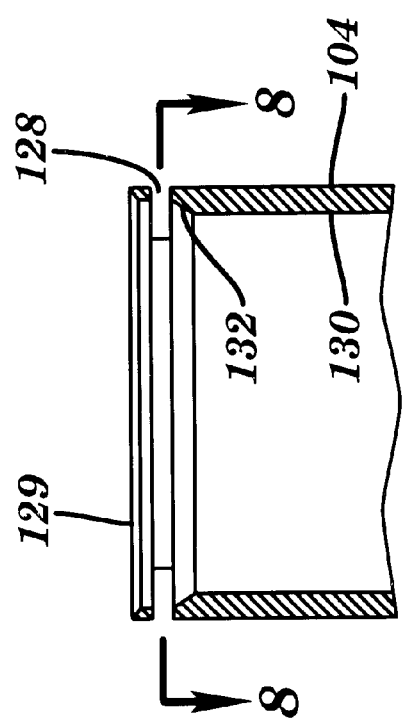
FIG. 6 is a side view of an outer sleeve of a flexible connector in accordance with the present invention.
Figure 7:
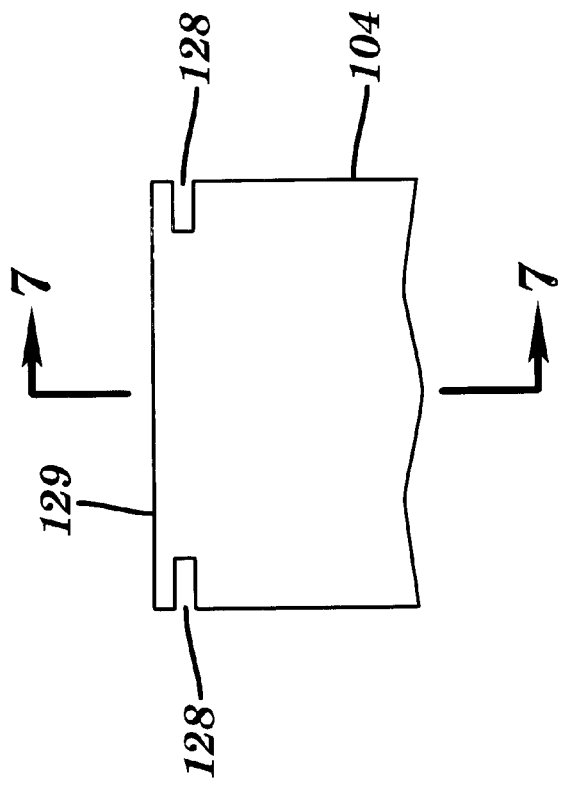
FIG. 7 is a cross-sectional view taken along lines 7—7 of FIG. 6.
Figure 10:
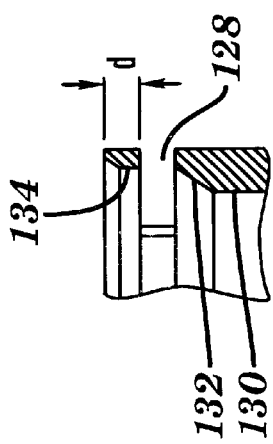
FIG. 10 is a partial cross-sectional view of an outer sleeve of a flexible connector in accordance with the present invention.
Figure 9:
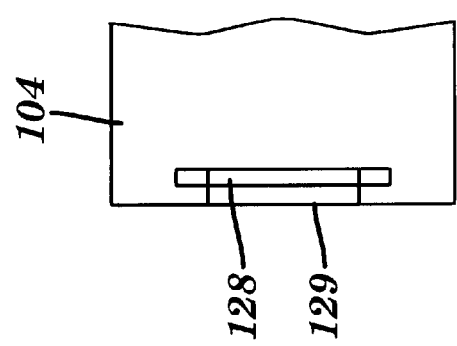
FIG. 9 is a side view of an outer sleeve of a flexible connector in accordance with the present invention.
Figure 8:
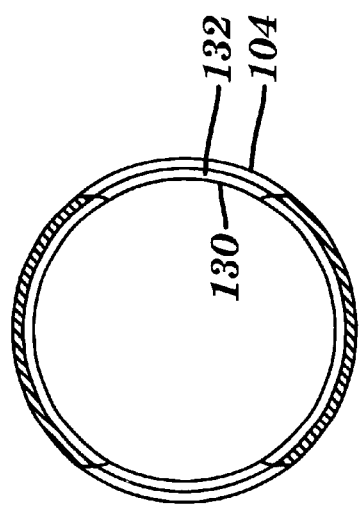
FIG. 8 is a cross-sectional view taken along lines 8—8 of FIG. 7.

As shown in FIGS. 2 and 3, inner sleeve 102 comprises a flange 110, a retaining groove 112, and a sealing groove 114. Inner sleeve 102 is preferably of a one piece construction. Although any material may be used to manufacture inner sleeve 102, it is preferably constructed out of 316 steel. Inner sleeve 102 is dimensioned to engage within outer sleeve 104, and preferably has a thickness ranging from 0.008–0.50 inches. Retaining groove 112 is defined within the wall of inner sleeve 102 and dimensioned and configured to engage retaining member 116 (FIG. 4). Sealing groove 114 is defined within the wall of inner sleeve 102 at a position further distanced from flange 110 than retaining groove 112. Sealing groove 114 is dimensioned and configured to harbor sealing member 118 (FIG. 5).

Retaining member 116 comprises a collar 120 and a pair of arms 122 extending therefrom, as illustrated in FIG. 4. At the distal end of each arm 122 is a protruding bulge 124. Retaining member 116 has a substantially planar cross-section allowing it to engage retaining groove 112. Collar 120 preferably has a suitable width and thickness which prevent flexing and/or torsional movement when engaged. Protruding bulge 124 allows retaining member 116 to remain engaged within retaining groove 112 and provides sufficient resistance to prevent accidental disengagement.

First portions 117 of arms 122 extend from collar 120 to about half the distance to the distal ends of arms 122 and may be of uniform cross section. Second portions 119 may extend from first portions 117 to the distal ends of arms 122. The non-abutting sides 121 of second portions 119, which do not abut the inner or outer sleeves, may be tapered toward the abutting sides 123 of arms 122 from first portions 117 to a point just before protruding bulges 124, where arms 122 protrude toward the inner and outer sleeves, 102 and 104. First portions 117 are sufficiently stiff to prevent flexing and torsional movement. Second portions 119 may be sufficiently flexible to allow the engagement and disengagement of retaining member 116 with inner sleeve 102 and outer sleeve 104, such that arms 122 deflect away from each other when protruding bulges 124 contact inner sleeve 102 and reconverge toward one another when protruding bulges 124 pass by inner sleeve 102.

Retaining member 116 may also be provided with key hole 126, which is formed within or may be alternatively attached to collar 120. Key hole 126 may be of any shape to allow a tool, such as pliers or the like, to engage retaining member 116 in such a manner as to effect its engagement and removal from flexible connector 100. Retaining member 116 is preferably constructed from 10/90 heat treated stainless steel.

Sealing groove 114 is configured to house a sealing member 118. Sealing member 118 may comprise a rubber O-ring, such as a Parker O-ring, or any other suitable sealing device which will form a substantially fluid tight seal. It may, for example, be resistant to leaks up to forty pounds per square inch of air.

Inner sleeve 102 may be constructed by any of a number of processes. One construction technique comprises machining inner sleeve 102 onto the end of an existing plumbing member. Alternatively, inner sleeve 102 may be formed or pressed into the end of a plumbing member. Additionally, once constructed, inner sleeve 102 may be affixed to various plumbing equipment.

Outer sleeve 104 is illustrated and described with reference to FIGS. 6–9. Although it may be made of any material, outer sleeve 104 is preferably made of 316 steel and has a thickness ranging from 0.008–0.50 inches. Also outer sleeve 104 may be constructed by any of a number of processes. One construction technique comprises machining outer sleeve 102 onto the end of an existing plumbing member. Alternatively, outer sleeve 102 may be formed or pressed into the end of a plumbing member. Additionally, once constructed, outer sleeve 102 may be affixed to various plumbing equipment.

Outer sleeve 104 has a pair of slots 128 positioned on opposite sides of the longitudinal axis of outer sleeve 104. Slots 128 are positioned at the distance d from the end 129 of outer sleeve 104. Distance d represents the spacing required to align slots 128 with retaining groove 112 when outer sleeve 104 is engaged with inner sleeve 102 such that end 129 is fully seated against flange 110. This allows retaining member 116 to engage slots 128 and retaining groove 112, thereby coupling inner sleeve 102 with outer sleeve 104.

Outer sleeve 104 has an inner wall 130 which has a tapered end 132. Tapered end 132 has an inner wall 134 which has a greater cross-sectional area than at a location on inner wall 130. Tapered end 132 allows an inner sleeve 102 fitted with a sealing member 118 to engage within outer sleeve 104 without damaging sealing member 118. Absent tapered end 132, sealing member 118 may be subjected to the sharp edges of slots 128 and may be damaged during connection of the inner and outer sleeves of flexible connector 100.

Figure 11:
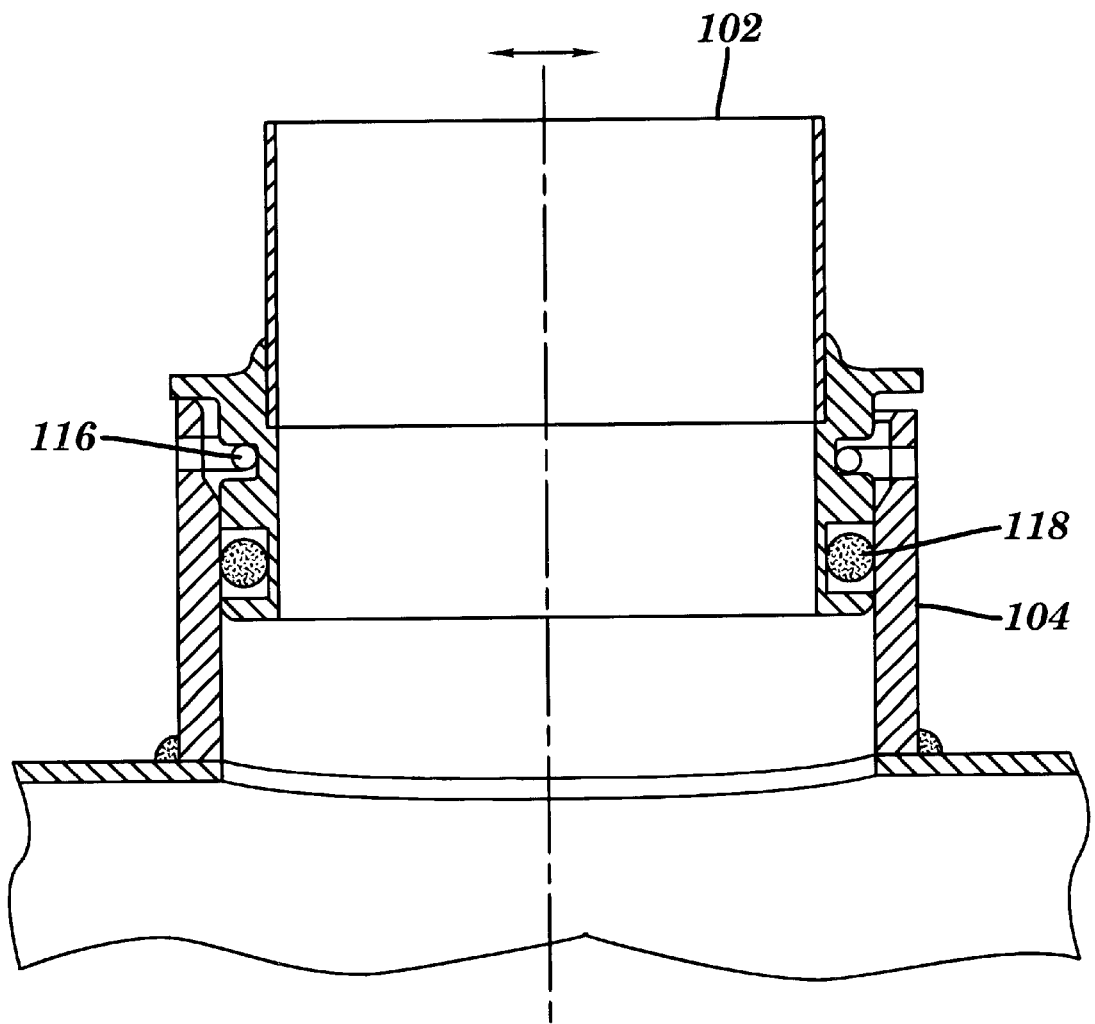
FIG. 11 is a cross sectional view of a flexible connector in accordance with the present invention.

In one embodiment of the invention, sealing groove 114 may be dimensioned larger than sealing member 118, and retaining groove 112 and slots 128 may be dimensioned larger than arms 122. Thus, slight axial and/or rotational movement of inner sleeve 102 might occur relative to outer sleeve 104 with sealing member 118 maintaining a seal between inner wall 130 of outer sleeve 104 and sealing groove 114, as illustrated in FIG. 11. This slight movement might allow a connection between pieces of plumbing to be somewhat flexible and less prone to damage caused by movement in the plumbing or impacts thereto. For example, the longitudinal axis of inner sleeve 102 might rotate or pivot up to six degrees from the longitudinal axis of outer sleeve 104 and preferably may rotate or pivot three degrees therefrom.

The slight movement permitted by the flexible connector might allow connections between pieces of rigid plumbing to be less exact and therefore time consuming than other such connectors. Such a range of movement might allow a tolerance of up to 0.010 inches for the connection of two such pieces of rigid plumbing. For example, a distance between an inner portion of outer sleeve 104 and an outer portion of inner sleeve 102 might be 0.010 inches. It will be appreciated that different tolerances could be selected to provide more of less movement and/or degrees of axial rotation or pivoting. Thus different tolerances may be required or desired when the flexible connector is used for different purposes.

The described invention might be used, for example, in a fuel cell system. Thus, sealing member 118 may be able to provide a seal for supplying reactant gas or fluids to, removing fluids from, and otherwise communicating and/or servicing fluids as desired within a fuel cell system. In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art. Thus, the flexible connector would be particularly useful as a connector for reactant gas flow streams. The connector would prevent potentially dangerous conditions, which might result if a leak (e.g., hydrogen) were allowed to leak into the system undetected. As described, sealing member 118 of the flexible connector may, for example, prevent leakage to a pressure of up to forty (40) pounds per square inch.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A connector comprising;
    an outer sleeve having an inner wall and a pair of juxtaposed slots;
    an inner sleeve having an outer surface, said outer surface having a first groove and a second groove defined herein;
    a sealing member located in said first groove of said inner sleeve, said sealing member providing a continuous seal between said inner wall of said outer sleeve and said outer surface of said inner sleeve when said inner sleeve is mated with said outer sleeve;
    a retaining member configured to engage said slots and said second groove when said inner sleeve is mated with said outer sleeve, said retaining member restricting the longitudinal movement of said inner and outer sleeves in relation to one another;

wherein said retaining member further comprises a collar and a pair of arms, wherein distal ends of said arms have inwardly protruding bulges for maintaining the retaining member in engagement with the second groove; and wherein said inner wall of said outer sleeve further comprises a plurality of tapered portions forming bottom sides of said slots to allow said sealing member to engage within said outer sleeve without being damaged.

2. The connector of claim 1 wherein at least one of said inner sleeve and said outer sleeve is formed of 316 steel.

3. The connector of claim 1 wherein at least one of the said inner sleeve and said outer sleeve has a thickness in the range of 0.008–0.50 inches.

4. The connector of claim 1 wherein a distance between an outer portion of said inner sleeve and an inner portion of said outer sleeve is up to 0.010 inches.

5. The connector of claim 1 wherein at least one of said inner sleeve and said outer sleeve is at least one of machined onto an existing plumbing member, formed into an existing plumbing member, and pressed into an existing plumbing member.

6. The connector of claim 1 wherein said slots are located at a distance from an end of said outer sleeve so as to align said slots with said retaining groove when said outer sleeve and said inner sleeve are engaged.

7. The connector of claim 1 wherein said inner wall of said outer sleeve further comprises a plurality of tapered portions forming bottom sides of said slots to allow said sealing member to engage within said outer sleeve without being damaged.

8. The connector of claim 1 wherein said sealing member comprises a rubber O-ring.

9. The connector of claim 1 wherein said arms further comprise first portions adjacent to said collar wherein said first portions substantially resist bending.

10. The connector of claim 9 wherein said arms further comprise second portions adjacent to said first portions and extending towards said distal ends, wherein said second portions are flexible so as to allow the engagement of said retaining member with said inner sleeve and said outer sleeve.

11. The connector of claim 10 wherein said second portions are tapered from said first portions towards said distal ends.

12. The connector of claim 1 wherein said retaining member further comprises a key hole for aiding a user in engaging and disengaging said retaining member, said keyhole being at least one of formed into said collar and attached to said collar.

13. The connector of claim 1 wherein said retaining member is formed of 10/90 heat treated stainless steel.

14. The connector of claim 1 wherein said first groove, said retaining member, said slots said second groove, and said sealing member are dimensioned such that said inner sleeve and said outer sleeve are capable of at least one of axial movement relative to each other and rotational movement relative to each other about an axis substantially perpendicular to a longitudal direction of said inner sleeve wherein said sealing member is adapted to maintain said seal between said inner wall of said outer sleeve and said outer surface of said inner sleeve.

15. The connector of claim 14 wherein said rotational movement is up to 6 degrees of rotation from at least one of an axis of said inner sleeve and an axis of said outer sleeve.

16. The connector of claim 15 wherein said rotational movement is 3 degrees of rotation.

17. The connector of claim 1 wherein said sealing member prevents leakage up to 40 pounds per square inch of air pressure.

18. The connector of claim 1 wherein said arms are adapted to elastically deform to allow said arms to pass said inner sleeve and said arms are adapted to elastically return when said arms have passed said inner sleeve.

19. A method of operating a flexible connector comprising:

inserting an inner sleeve into an outer sleeve such that a sealing member located in a first groove of said inner sleeve forms a seal with an inner wall of said outer sleeve and an outer surface of said inner sleeve;

mating a retaining member to said inner sleeve and said outer sleeve such that arms of said retaining member engage a second groove of said inner member and a slot of said outer member, wherein said mating comprises a plurality of arms of said retaining member elastically deforming to pass said inner sleeve and said plurality of arms elastically returning to retain said inner sleeve relative to said outer sleeve; and inhibiting damage of said sealing member when inserting said inner sleeve into said outer sleeve by passing said sealing member by a plurality of tapered portions forming bottom sides or said slot.

20. A connector comprising:

an outer sleeve having an inner wall and a pair of juxtaposed slots;

an inner sleeve having an outer surface, said outer surface having a first groove and a second groove defined therein;

a sealing member located in said first groove of said inner sleeve, said sealing member providing a continuous seal between said inner wall of said outer sleeve and said outer surface of said inner sleeve when said inner sleeve is mated with said outer sleeve;

a retaining member configured to engage said slots and said second groove when said inner sleeve is mated with said outer sleeve, said retaining member restricting the longitudinal movement of said inner and outer sleeves in relation to one another;

said retaining member further comprising a collar and a pair of arms, wherein distal ends of said arms have inwardly protruding bulges which maintain the retaining member in engagement with the second groove; said arms further comprising first portions adjacent to said collar wherein said first portions substantially resist bending; and said arms further comprising second portions adjacent to said first portions and extending towards said distal ends, wherein said second portions are flexible so as to allow the engagement of said retaining member with said inner sleeve and said outer sleeve; and wherein said second portions are tapered from said first portions towards said distal ends.

21. The connector of claim 20 wherein said inner wall is tapered toward an end of said outer sleeve adapted to receive said inner sleeve, said tapering providing a clearance between said inner wall and said outer surface, when said outer sleeve receives said inner sleeve; and wherein said clearance allows rotational movement of said inner sleeve and said outer sleeve relative to each other about an axis substantially perpendicular to a longitudinal direction of said inner sleeve.

* * * * *

UNITED STATES PATENT AND TRADEMARK OFFICE
CERTIFICATE OF CORRECTION

PATENT NO.   : 6,447,022 B1
DATED        : September 10, 2002
INVENTOR(S)  : Allen It is certified that error appears in the above-identified patent and that said Letters Patent is hereby corrected as shown below:

Column 5,
Lines 27-31, cancel claim 7.

Signed and Sealed this

Thirteenth Day of May, 2003

JAMES E. ROGAN
*Director of the United States Patent and Trademark Office*